Nov. 22, 1949 — C. V. LARRICK — 2,489,092
HIGH-FREQUENCY SURFACE TESTING INSTRUMENT
Filed Sept. 25, 1946
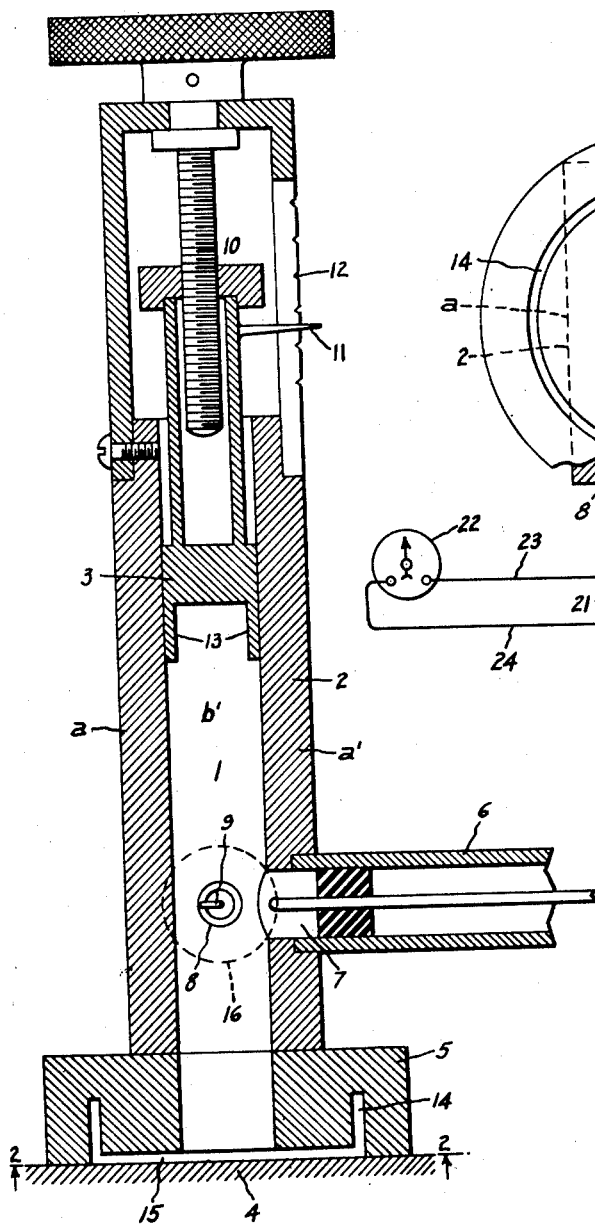
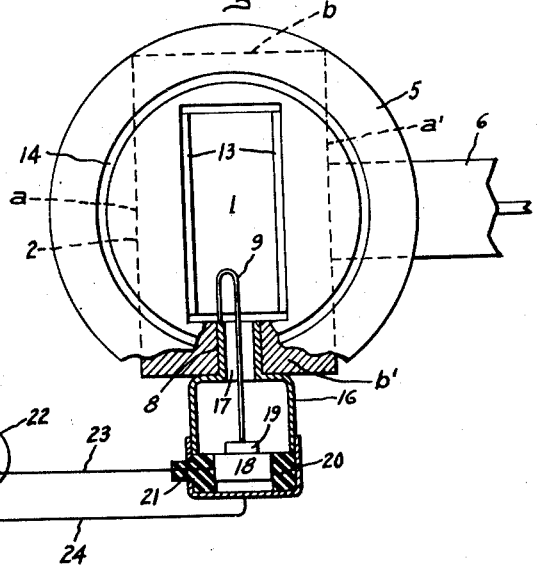
Inventor:
Charles V. Larrick,
by *Braxell S. Mack*
His Attorney.

Patented Nov. 22, 1949

2,489,092

UNITED STATES PATENT OFFICE 2,489,092

HIGH-FREQUENCY SURFACE TESTING INSTRUMENT

Charles V. Larrick, Schenectady, N. Y., assignor to General Electric Company, a corporation of New York Application September 25, 1946, Serial No. 699,173

6 Claims. (Cl. 175—183)

My invention relates to metal surface testing and more particularly to a method and apparatus by which the surface resistance of metal may be measured or by which the thickness of nonconducting coatings on metal may be measured.

A process for hardening the surface of metal, commonly known as "shot peening" has come into general use. The degree of hardness attained is dependent upon such factors as the length of time the specimen is subjected to shot peening, the physical characteristics of the metal treated and the forces employed. It has been found that small surface cracks which lead to fatigue in the untreated metal may be eliminated or at least minimized by such a process.

It has also been found that the electrical resistance characteristics of metal change when subjected to shot peening and change to a degree dependent upon the extent to which the metal is so treated. Thus, conversely, the degree of shot peening is measurable in terms of the resistance of the treated metal. However, since shot peening affects only a thin surface layer of the metal, resistance measurement techniques must include means by which electrical current flow will be confined to this relatively thin surface layer. This may be accomplished by utilizing the phenomenon known as "skin effect" wherein high frequency electrical currents flow much more readily at or near the surface of a homogeneous conducting metal than elsewhere within the conductor.

Methods have been devised whereby the energy losses occasioned by electrical currents in the metal induced by high frequency fields may be measured and surface conditions thereby explored. However, the difficulty of confining the high frequency field sufficiently to eliminate losses in surrounding material other than the material under test has reduced the accuracy of results obtained by these methods. In addition, the proximity of the material tested to the high frequency exploring electrode also influences the energy losses and it is sometimes difficult to compensate for this effect particularly with materials of irregular shape or curvature.

This proximity effect is sometimes used to determine the thickness of a nonconducting coating on a conducting metal.

However, it is so subject to stray effects as described previously that its usefulness is limited to smooth flat plates or plates with only slight curvature. Thicknesses of coatings on magnetic material are quite accurately measured by instruments based on measuring the reluctance of a magnetic circuit consisting of a magnetic yoke with two opposite pole pieces resting on the coated magnetic material. The reluctance is directly dependent upon the separation of these pole pieces from the bridging magnetic material, which separation is dictated by the thickness of the nonmagnetic coating in the material.

It is an object of my invention to provide a new and improved measuring device whereby surface resistances of conducting materials, magnetic or nonmagnetic, may be determined accurately.

It is another object of my invention to provide a new and improved measuring device whereby the thickness of nonconducting coatings on conducting material, magnetic or nonmagnetic, may be determined accurately.

It is a further object of my invention to provide a compact, readily usable measuring device suitable for use on irregular surfaces wherein the errors of proximity effect are minimized.

The features of the invention which are believed to be novel and patentable will be pointed out in the claims appended hereto. For a better understanding of the invention, reference is made in the following description to the accompanying drawing in which Fig. 1 is a cross-sectional side view of one embodiment of my invention and Fig. 2 is a partially cutaway view from the bottom along the line 2—2 of Fig. 1.

Standing wave phenomena in transmission lines or wave guides result whenever a traveling wave encounters a discontinuity in its travel. Thus if a transmission line is shorted at some point, almost total reflection occurs and the progressing wave and returning wave interact to cause a standing wave. Further, if a transmission line is energized somewhere along its length and both ends are shorted, standing waves will exist along its total length if the two low resistance terminated points are separated by a distance exactly equal to $(n/2)$ times the wavelength of the energizing source where $n$ is any integer. In such a line the voltage is obviously minimum at the ends and the current is maximum. At a point one-quarter wavelength from the end and at the points spaced $$\left(\frac{n}{2} + \frac{1}{4}\right)$$

times the wavelength from either end the voltage is maximum and the current is minimum. At points spaced $$\frac{n}{2}$$

times the wavelength from either end, the current is maximum and the voltage is minimum. When this condition exists the line is said to be resonant and the enclosure is referred to as a cavity resonator.

Standing waves present another aspect. At the closed end of the line or wave guide the impedance is very low equaling the ohmic resistance of the closing member. At the points along the line or wave guide where the voltage is maximum and the current is minimum the line may be considered to be terminated, at these points, by an extremely high impedance. Thus, a line one-quarter wavelength long, shorted at one end, presents an extremely high input impedance and a line one-half wavelength long, shorted at one end, presents an extremely low input impedance. Furthermore, as may be deduced from the above facts, a lossless quarter wavelength line terminated in infinite impedance, presents zero input impedance.

Resonance in a wave guide or transmission line exhibits the same characteristics as are evident in resonance in a simple series circuit containing lumped constants of R, L and C. Thus energy is stored in the inductance and capacitance alternately and at resonance these energy storage values are equal. Also, the current flow and therefore the maximum energy storage in each is dependent upon the value of resistance. Furthermore, maximum energy can be measured in terms of the electrostatic field intensity or of the magnetic field intensity. These facts remain true even though, as in the case of a wave guide, the R, L and C components are not physically distinguishable.

Referring now to Fig. 1, a cavity resonator is shown in cross-sectional view. The resonating chamber 1 comprises a tubular wave guide 2, a shorting plug 3 within the wave guide near one of its ends, conducting metal test specimen 4 across the open end of the wave guide, and connecting means 5 commonly called a "Choke joint" fixed about the wave guide at its open end. That surface of specimen 4 whose resistance is to be measured, such as a shot-peened surface, is exposed to the open end of wave guide 2. If coating thickness on a specimen such as 4 is to be measured, the surface so coated is exposed to the open end of wave guide 2. Energy of high frequency, such as 9375 megacycles, is introduced into chamber 1 by the coaxial line coupling 6 entering the chamber through opening 7 in the wave guide. An opening 8 is provided in the wave guide at right angles to opening 7 into which a pickup loop or probe 9 of a measuring device, as shown in Fig. 2 and to be described with reference thereto, is inserted for the purpose of measuring the energy within chamber 1. The position of shorting plug 3 may be adjusted by conventional adjusting means 10 and its position indicated by an indicator such as 11 on scale 12. Shorting plug 3 has fingers 13 integral with it extending downwardly along its periphery to a length equal to one quarter wavelength. By use of such fingers shorting plug 3 is connected electrically to the wave guide at a point one quarter wavelength from the end of chamber at which point, as explained previously, a minimum current exists for resonance conditions in the cavity resonator and the effect of contact resistance between the wave guide and the end of fingers 13 is minimized.

Connecting means 5 consists of a cylindrical metal block with a central aperture identical in size and shape with the inside dimensions of wave guide 2 to which 5 is connected, as by brazing, in such manner that the opening in 5 becomes an extension of wave guide 2. An annular groove 14 on a diameter equal to one-half wavelength plus the inside width, in the direction of the line 2—2, of the wave guide 2 is cut to a depth equal to one-quarter wavelength plus the amount of undercutting of the portion embraced by the annular groove. This undercutting is shown at 15 and may conveniently be made equal to the width of groove 14. However, its value is not critical and it may be made any amount necessary to provide proper clearance.

Referring to Fig. 2, the energy measuring means may be described. Other portions of the device are numbered identically with identifying numbers in Fig. 1 and need not be redescribed.

A metallic cylindrical enclosure 16 includes a hollow cylindrical tube 17 projecting axially from one end of enclosure 16. A metallic crystal holder 18 upon which is placed the crystal 19 is mounted axially near the other end of enclosure 16 by means of the annular shaped insulation 20 and in capacitive relationship to the end wall of enclosure 16. An opening 21 through enclosure 16 radially disposed from the crystal holder 18 allows one terminal of the galvanometer 22 to be connected to the crystal by means of lead 23. Lead 24 connects the remaining terminal of galvanometer 22 to enclosure 16. One leg of the hairpin loop 9 is affixed to the rim of tube 17 and the other leg passes into enclosure 16 through tube 17 and its end rests upon a sensitive portion of crystal 19. Tube 17 of enclosure 16 is inserted into opening 8 of wave guide 2 in such manner that loop 9 is other than parallel to the length of wave guide 2. Maximum coupling between loop 9 and the longitudinal magnetic field present within wave guide 2 when it is energized exists when loop 9 is perpendicular to the length of wave guide 2.

While the embodiment of my invention as shown in the drawing utilizes an energy input device of the voltage feed type and the measuring instrument as shown measures the magnetic field intensity it is apparent that energy may be introduced by a current feed coupling and a device for measuring the electrostatic field intensity may be used without departing from the scope of my invention.

There are various wave types which may exist in a tubular wave guide cavity resonator. For illustrations and explanation of these possible types reference may be made to "Fields and Waves in Modern Radio" by Ramo and Whinnery, published by John Wiley and Sons, copyright 1944, or other similar sources. Of these types, the simplest type is the so-called $TE_{10}$ wave type which exists in rectangular wave guides. In addition, the polarization of its field is definitely fixed and attenuation due to copper losses is not excessive, both of which facts are important in engineering applications. Thus, the operation of my invention will be described for a rectangular wave guide resonating with a $TE_{10}$ type wave. A $TE_{10}$ type wave in the cavity resonator of Fig. 1 has an electrostatic field between the side walls $a$ and $a'$ (left to right or right to left in Fig. 1). The intensity, maximum on the longitudinal center line of $a$ or $a'$, decreases from the center line toward either of the walls $b$ or $b'$. The transverse magnetic field is at right angles to the electrostatic field and 90 electrical time degrees out of phase with it. The principal current path is along an inside perimeter in the plane through the longitudinal center lines of $a$ and $a'$ with lesser paths represented by movement of this plane parallel to itself toward $b$ and $b'$. Thus an electrically closed circuit must be provided from $a$ to $a'$ through the test specimen 4. This may be accomplished by use of connecting means 5.

The annular groove 14 forms a coaxial transmission line in which the material outside the groove constitutes the outer conductor and the material embraced by the annular groove is the inner conductor. Thus the electrical impedance across its open end is extremely high since the line is made one quarter wavelength long. The circular space 15 between test specimen 4 and the portion of 5 embraced by annular groove 14 constitutes a radial transmission line. Explanation may more easily be made by considering first only that portion in the plane through the longitudinal center lines of $a$ and $a'$. Such a section is equivalent to a wave guide which as described previously is one quarter wave length long. Since it is terminated by the extremely high impedance of the coaxial line formed by annular groove 14 plus the contact impedance between the test specimen 4 and connecting means 5 its input impedance at the inner end of $a$ or $a'$ is extremely small thereby effectively connecting the end of $a$ to the test specimen 4 at the point immediately below $a$ and operated similarly as to $a'$. It is apparent that the contact resistance between specimen 4 and connecting means 5 is unimportant and in fact no actual electrical contact is required. Other portions of the circular space 15 in planes parallel to the plane through the longitudinal center lines of $a$ and $a'$ yield wave guides only slightly less than one quarter wavelength long which are terminated in extremely high impedance. Such lines do not present zero input impedance but if only slightly less than one quarter wavelength long their input impedance is low. Furthermore, this impedance enters into current paths of lesser current density. Thus, test specimen 4 is made to effectively terminate the wave guide with a resistance dependent upon its characteristics and located at a point dependent upon the spacing between it and the outer ring of connecting means 5. It is apparent that similar results may be obtained in like fashion by connecting means of different configuration and I therefore desire to have it understood that my invention is not limited to the connecting means described.

The galvanometer measuring circuit shown in Fig. 2 may be explained in the following manner. Pickup loop 9 has a voltage induced in it to an extent dependent upon the varying magnetic field which is linked by it. This voltage is rectified by the action of crystal 19 so that crystal holder 18 assumes a pulsating direct current voltage value with respect to the enclosure 16. These pulsations are minimized by the condenser action between holder 18 and enclosure 16 across the spaced gap between them. This direct current voltage value which is directly dependent upon the magnetic field intensity in the region of pickup loop 9 is measured and indicated by the high resistance galvanometer 22. If it is desirable to decrease the sensitivity or maximum indication of the measuring circuit this may be accomplished by decreasing the coupling of loop 9 by rotating its axis toward the direction of the magnetic lines of flux in which it is placed.

My invention may be used to measure the surface resistance of materials by a comparison method in the following manner. The testing device may be placed upon a standard specimen whose characteristics are known and the instrument energized through input lead 6 from a source of appropriate high frequency energy. Adjusting means 10 is manipulated until the reading of galvanometer 22 is a maximum indicating a resonant condition. The device is then placed upon a test specimen, energized, and the galvanometer reading again observed. No readjustment of means 10 should be required. Since, as has been pointed out, resonant conditions such as energy storage or field intensities are dependent upon resistance the galvanometer reading decreases for an increase in resistance and its decrease is therefore a measure of the unkown surface resistance in terms of the surface resistance of the standard specimen. It is apparent that the resistance values referred to are surface resistances since extremely high frequencies of the order of 9375 megacycles are employed whereby induced currents remain at or near the surface of conducting materials.

My invention may also be used as a thickness gauge to measure the thickness of nonconducting coatings such as paint and the like on conducting materials by a nondestructive method. The device may be placed upon a noncoated specimen, otherwise similar to the coated specimen whose coating thickness is to be measured, energized from a high frequency source and adjusting means 10 manipulated until galvanometer 22 reads the maximum value. At this resonant condition, the distance from the effective metal surface layer of the specimen to the effective metal surface layer of shorting plug 3 is $n/2$ times the wavelength of the energizing source. The device is then placed upon a coated specimen and adjusting means 10 changed until resonance again occurs as evidenced by the maximum reading of galvanometer 22. The amount of change is measured by means of the readings of indicator 11 on scale 12. The change in setting is caused by the displacement of the specimen from the device occasioned by the intervening coating and some effect of the dielectric constant of the coating and possible effect of slower wave propagation through the coating so that the change in setting is not a direct measure of the coating thickness. However, the device may be calibrated for various thicknesses of the coating to be measured and the device thereafter used to accurately measure thicknesses of the coating for which it is calibrated.

As will occur to those skilled in the art, various different arrangements and combinations of the principles described above may be employed without departing from the true spirit and scope of my invention and I therefore do not wish to limit my invention to the particular arrangement described.

What I claim as new and desire to secure by Letters Patent of the United States is:

1. A measuring instrument comprising a tubular wave guide, a movable shorting plug within said wave guide and closing one end thereof, positioning means for said shorting plug, means adapted to electrically connect the material to be tested across the opposite end of said wave guide, means for supplying high frequency energy to the wave guide and means for measuring the field intensity therein.

2. In combination, a tubular wave guide closed at one end by a shorting plug and adapted at the opposite end for electrical closure by the material to be tested, means for supplying high frequency energy to said wave guide, means for measuring the field intensity within said wave guide, and means for adjustably positioning said shorting plug within said wave guide.

3. A measuring instrument of the cavity resonator type comprising a tubular wave guide, a movable shorting plug within said wave guide and closing one end thereof, means for controlling the position of said shorting plug in a lengthwise direction within said wave guide, means mounted on the opposite end of said wave guide adapted to contact the surface of a material to be tested in such manner that said wave guide is electrically closed at one end by said material, means for supplying high frequency energy to said wave guide and means for measuring the field intensity therein.

4. A measuring instrument comprising a cavity resonator adjustable in length and one portion of which is open and adapted to be closed electrically by the material to be tested, means for supplying high frequency energy to said cavity resonator, means for measuring the field intensity therein, means for adjusting the length of said resonator, and means responsive to said means for indicating the length of said cavity resonator.

5. An instrument for measuring surface layer characteristics of an electrically conducting material, comprising a tubular cavity resonator open at one of its ends, a circular joint for electrically connecting such surface layer across said open end, calibrated means for adjusting the length of said resonator, means to supply high frequency electro-magnetic energy to said resonator, and means to measure the electromagnetic field intensity in said resonator.

6. The method of measuring the resistivity of a surface layer of a conducting material, comprising supplying high frequency electro-magnetic energy to a cavity resonator, electrically connecting such surface layer across an opening located at a point of high current density in the wall of said resonator, so that high-frequency current flows through such surface layer responsive to said electro-magnetic energy, measuring the electromagnetic field intensity within said resonator, and comparing the value so measured with standard values determined from similar measurements of samples of known resistivity.

CHARLES V. LARRICK.

REFERENCES CITED

The following references are of record in the file of this patent:

UNITED STATES PATENTS

| Number | Name | Date |
|---|---|---|
| 2,106,768 | Southworth | Feb. 1, 1938 |
| 2,151,118 | King et al. | Mar. 21, 1939 |
| 2,206,923 | Southworth | July 9, 1940 |
| 2,358,462 | Mahren | Sept. 19, 1944 |
| 2,421,912 | Spooner | June 10, 1947 |
| 2,423,506 | Landon | July 8, 1947 |